Nov. 5, 1940.  J. J. NEUMAN  2,220,848
DEVICE FOR REDUCING SIDE WEAR UPON BELTS IN PULLEYS
Filed Jan. 25, 1940
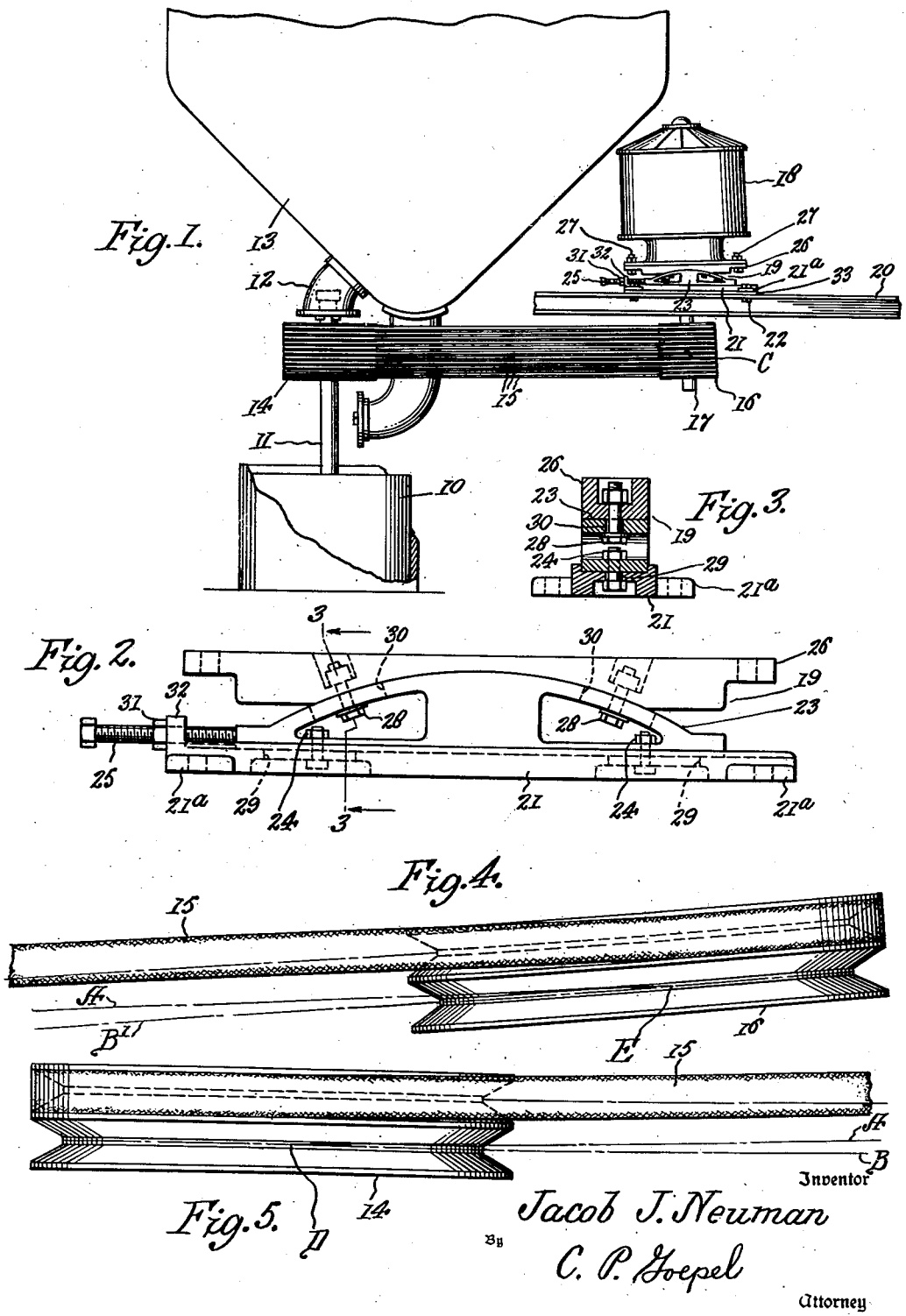
Inventor
Jacob J. Neuman
C. P. Goepel
Attorney Patented Nov. 5, 1940

2,220,848

UNITED STATES PATENT OFFICE

2,220,848

DEVICE FOR REDUCING SIDE WEAR UPON BELTS IN PULLEYS

Jacob J. Neuman, South Salem, N. Y., assignor to United States Patent Development and Royalty Company, South Salem, N. Y., a company of New York Application January 25, 1940, Serial No. 315,610

5 Claims. (Cl. 74—219)

The present invention relates to improvements in devices for reducing side wear upon belts in pulleys, and generally has for an object to prevent the undue side wear caused by misalinement of the belt in pulley grooves, particularly at the entrance point of the belt with reference to such grooves.

The invention is shown and described in connection with the V belt drives employed for operating centrifugal sugar extractors such as are used to dry or otherwise process sugar magmas or like materials.

The application of V belts to such a drive presents several difficulties not ordinarily encountered. Due to the manner in which such machines are operated the axis of both the driving and the driven shafts must be vertical. Due to the position of the mixer tank from which the centrifugals are supplied with fillmass and other obstructions formed by various apparatus associated with such machines, it is necessary that the driver and driven shafts be separated by a considerable distance. The gravitational pull to which the ropes are subjected thus results in considerable sag in the ropes between sheaves tending to make the ropes ride the grooves incorrectly producing excessive wear and maintenance expense. It might be thought that such sagging of the ropes or belts could be eliminated by increasing the tension. However, this method would further increase wear on the ropes and in addition increases friction and wear on bearings in both the motor and spindle of the centrifugal. Also due to the gyratory manner in which the basket of the centrifugal is suspended from its bearings, this tends to cause the shaft to run out of plumb resulting in difficulties well known to the art. The primary object of this invention is therefore to provide means for overcoming these difficulties, thus making possible the successful application of V belt drives to centrifugal machines.

It will be understood that the same or like difficulties will present themselves in applying V belt drives to other types of machinery; the invention being herein shown applied to a centrifugal primarily for the purpose of illustrating one important application.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a fragmentary elevation showing one manner of applying the invention to the drive for a centrifugal extractor machine.

Figure 2 is a side elevation on an enlarged scale of the sheave or pulley adjusting members.

Figure 3 is a vertical cross section taken on the line 3—3 in Figure 2.

Figures 4 and 5 are fragmentary edge views of the two pulleys and belt showing the catenary curve with reference to the centerlines of the pulley grooves.

Referring more particularly to the drawing, 10 designates a conventional centrifugal extractor, the vertical shaft 11 of which is suspended from the bearing 12. Such bearing 12 is supported from the mixer tank 13. Mounted on the shaft 11 is the sheave or pulley 14 driven through the multiple V ropes 15 from the motor sheave or pulley 16 mounted on the shaft 17 of the motor 18.

The motor 18, shaft 17 and motor sheave 16 are mounted for three-way movement. A part of this movement results from the motor 18 being mounted on two slide rails, generally designated at 19, which are in turn mounted upon a platform or other structure indicated at 20. The motor support consists generally of three members, of which the rails are designated at 23 and 26. The lowermost part of the support consists of a base member 21 having perforated ears 21a by means of which it is secured to the platform 20 with the bolts 22. Slidably mounted on the base 21 is the longitudinally adjustable member 23 having a convex upper surface struck on an arc of a circle having its center C at the center of the sheave or pulley 16.

The longitudinally adjustable member 23 is secured to the base member 21 by bolts 24, the base member 21 having slots 29 to permit moving the member 23 by means of the take-up screws 25. The angularly adjustable member or rail 26 to which the motor feet are bolted by the bolts 27 is formed with a concave lower surface matching the convex upper surface of the longitudinally adjustable member 23 and secured thereto by bolts 28.

The holes for the bolts 28 are slotted, as indicated at 30 in the member 23, allowing the upper member 26 to be tilted and when properly adjusted to be secured in this position. It will be noted that, due to the fact that the arc, forming the joint between the members 23 and 26, has its center C at the geometrical center of the motor sheave 16 that no matter how these parts are relatively shifted in an angular sense or direction the motor sheave 16 does not shift in regard to elevation or center distance from its companion sheave 14, the only change being in the angle.

A lock nut 31 may be run on the adjusting screw 25 to engage the perforated threaded lug 32 of the base member 21. The adjusting screw 25 has threaded engagement through the lug 32 and abuts against member 23 or is connected in any suitable manner to the member 23. After the adjustment the lock nut 31 is run up against the lug 32 to hold the parts in adjusted position.

Shims or other suitable elevating devices 33 may be placed between the platform 20 and the base member 21 in order to raise up the entire unit which includes the motor 18, the members 21, 23, 26, the shaft 17 and the motor sheave 16.

In operation, any flexible member suspended from two points, the vertical axes of which are horizontally separated forms a catenary curve which is tangent to the horizontal plane at its low point. Considering the ropes 15, if the sheave 14 is made the low point of the catenary curve A formed by the ropes, then they will become tangent to the centerline B of the grooves in the sheave 14 at the entrance point D shown in Figure 5.

If the sheave 16 is then tilted at the correct angle and raised above the sheave 14 to the correct elevation, as by the shims 33 under the motor 18 or base member 21 or by the use of other means, then the centerline of the catenary curve A will become tangent to the centerline B—1 at the point of entrance indicated at E in Figure 4.

It is thus seen that side wear due to friction will be eliminated and the ropes 15 will track properly in the grooves of both sheaves 14 and 16. As the ropes 15 stretch the tension is brought back to the correct value by loosening the bolts 24 and operating the take-up screws 25. By loosening the bolts 28 the motor or other support for the shaft 17 is capable of being angularly adjusted by the member 26 moving relatively to the member 23, after which the bolts 28 are retightened. Thus the motor sheave 16 may have an angular movement, an elevating movement and a belt-tensioning movement.

It is obvious that various changes and modifications may be made in the details of construction and design of the above specifically described embodiment of this invention without departing from the spirit thereof, such changes and modifications being restricted only by the scope of the following claims:

What is claimed is:

1. In a device for reducing side wear on belts by the side walls of pulley grooves, the combination with a flexible belt, and a pair of pulleys horizontally separated and having grooves for receiving said belt, a support for one of said pulleys adapted to be elevated for raising the supported pulley above the plane of the companion pulley to such a position that the center line of the groove of the companion pulley at the entrance point of the belt to such groove will be tangent to the catenary curve represented by the belt, and means for permitting angular adjustment of said raised pulley about its own geometrical center to a position where the inclined centerline of the groove of the raised pulley at the entrance point of the belt to such groove is tangent to said catenary curve.

2. In a device of the kind described, the combination with a pair or horizontally separated grooved pulleys, and a flexible belt trained over said pulleys and occupying the grooves therein, a support for one pulley adapted to be elevated for raising said supported pulley in a substantially vertical sense to a position where the centerline of its groove is vertically above the centerline of the groove of the companion pulley, means for permitting angular adjustment of the raised pulley substantially about its own geometrical center, and means for permitting adjustment of said elevated support and the raised pulley carried thereby toward and from the companion pulley.

3. In a device of the kind described, the combination of horizontally spaced grooved pulleys, a flexible belt entrained with said pulleys, a shaft for one pulley, a platform having an opening through which said shaft loosely projects, a motor in driving and supporting relation to said shaft, an angularly adjustable member carrying said motor, a longitudinally adjustable member carrying said angularly adjusting member, said members having mutual concave and convex surfaces therebetween, means for locking said members in adjusted position, a base member for supporting said longitudinally adjustable member, means for adjusting said longitudinally adjustable member on said base member, and spacing means between the base member and said platform for maintaining said base member at a suitable elevation.

4. The combination with a pair of horizontally disposed, longitudinally spaced pulleys having belt receiving grooves, and a flexible belt trained over said pulleys into the grooves thereof and suspended between said pulleys, said suspended belt forming a catenary curve; of means for permitting vertical adjustment on one of said pulleys above the plane of the other pulley, whereby the lowest point of said catenary curve is substantially at the point of entrance of said belt into the groove of said other pulley, and the horizontal center line of the groove of said other pulley is tangent to said catenary curve at said point of entrance, and means for permitting angular adjustment of said one pulley about its geometrical center to bring the horizontal center line of its groove tangent to said catenary curve at the point of entrance of said belt into said groove.

5. In a belt drive of the type including a pair of horizontally disposed, longitudinally spaced pulleys having bevelled walls to form grooves, and a flexible belt trained over said pulleys into the grooves thereof and suspended horizontally between said pullleys to form a catenary curve; the improvement which consists in mechanism for reducing side-wear on said belt by the bevelled walls of the pulleys, comprising a support for maintaining one of said pulleys above the horizontal plane of the other of said pulleys, whereby the lowest point of said catenary curve is substantially at the point of entrance of said belt into the groove of said other pulley and the center line of the groove of said other pulley is tangent to said catenary curve at said point of entrance, and means on said support for permitting angular adjustment of said elevated pulley about its geometrical center, whereby the center line of the groove of said elevated pulley is tangent to said catenary curve at the point of entrance of said belt into the groove of said elevated pulley.

JACOB J. NEUMAN.